(12) United States Patent
Jagers (10) Patent No.: US 12,019,713 B2
(45) Date of Patent: Jun. 25, 2024

(54) METHOD AND DEVICE FOR LOCATING AN IMAGE RECORDING OF AN OBJECT TAKEN FROM A DISTANCE

(71) Applicant: Schwarm Technologies Inc., San Francisco, CA (US)

(72) Inventor: Stefan Jagers, Bodelshausen (DE)

(73) Assignee: Schwarm Technologies Inc., San Franscisco, CA (US)

( * ) Notice: Subject to any disclaimer, the term of this patent is extended or adjusted under 35 U.S.C. 154(b) by 451 days.

(21) Appl. No.: 17/462,214

(22) Filed: Aug. 31, 2021

(65) Prior Publication Data

US 2022/0391626 A1  Dec. 8, 2022

(30) Foreign Application Priority Data

Jun. 7, 2021 (DE) ...................... 10 2021 205 730.6

(51) Int. Cl.

| | |
|---|---|
| *G06F 18/22* | (2023.01) |
| *G06F 18/21* | (2023.01) |
| *G06F 18/214* | (2023.01) |
| *G06N 20/00* | (2019.01) |
| *G06T 7/00* | (2017.01) |
| *G06T 7/70* | (2017.01) |

(52) U.S. Cl.
CPC ............ *G06F 18/22* (2023.01); *G06F 18/214* (2023.01); *G06F 18/217* (2023.01); *G06N 20/00* (2019.01); *G06T 7/70* (2017.01); *G06T 7/97* (2017.01); *G06T 2207/10032* (2013.01); *G06T 2207/20084* (2013.01)

(58) Field of Classification Search
CPC ...... G06F 18/22; G06F 18/214; G06F 18/217; G06T 7/70; G06T 7/97; G06T 2207/10032

See application file for complete search history.

(56) References Cited

U.S. PATENT DOCUMENTS

2022/0057515 A1\*  2/2022  Viswanatha ............ G01S 17/34

\* cited by examiner

*Primary Examiner* — Diane D Mizrahi

(74) *Attorney, Agent, or Firm* — Wood Herron & Evans LLP (57) ABSTRACT

A method is provided for locating an image recording of an object such as a celestial body, recorded by at least one imaging recording device from a distance. The method includes acquiring image data which represent the image recording and its point in time of recording; acquiring measurement data which represent, for the point in time of recording, a respective measurement signal of at least one sensor device which is arranged in a surface portion of the object; and matching the image data and the measurement data. The method also includes locating the image recording with respect to the object by a determination of a position in the image recording which corresponds to the location of the sensor device on the basis of the matching, and an associating of the location information with this position.

17 Claims, 5 Drawing Sheets

METHOD AND DEVICE FOR LOCATING AN IMAGE RECORDING OF AN OBJECT TAKEN FROM A DISTANCE

CROSS-REFERENCE TO RELATED APPLICATION

This application claims priority to German Patent Application No. 10 2021 205 730.6, filed Jun. 7, 2021. The above-mentioned patent application is incorporated herein by reference in its entirety.

TECHNICAL FIELD

This application relates to a method, a computer program, and a device for locating an image recording of an object, such as of the Earth or of another natural or artificial celestial body or of a surface portion thereof, recorded by at least one imaging recording device from a distance, such as from a great distance.

BACKGROUND

The recorded material can comprise aerial images or satellite images, so that the recording device can be located on or in an aerial vehicle or a space vehicle. Accordingly, recording distances between the recording device and the recorded object are conceivable which are in the range of several hundred meters or several kilometers up to more than 100 km. In particular, the recorded material may form a series of images or a different group of a plurality of images that, in total, represent a surface area on the object that is too large to be represented in a complete manner on a single one of the recorded images. Such series of images or groups are known in connection with surface maps of celestial bodies, in particular the Earth, as they are used, for example, in navigation applications which, these days, are common for smartphones and computers. There, the overall image of the surface of the Earth is assembled from a multitude of overlapping individual images recorded in a satellite-based manner.

It is also known to make weather forecasts on the basis of satellite photos, on which clouds in the atmosphere of the Earth may be represented.

In many applications, such as for example in relation to weather forecasts or planning of infrastructure projects, such as for example the construction or the operation of railroad lines, it is helpful or even necessary to locate the images as precisely as possible in relation to the surface of the object, so that any image elements or even individual pixels which are shown on the images can be assigned as precisely as possible to a position on the surface of the object. However, a precise assignment, in terms of location, of such images taken from a distance can be made more difficult by the fact that the determination of an orientation and of a position of the recording device in space and/or of height differences in the recorded area on the surface of the object can be subject to non-negligible inaccuracies.

It would therefore be desirable to provide an improved solution, which is improved with regard to the accuracy which can be achieved, for locating image recordings of an object taken from a distance, in particular of aerial images or of satellite images.

SUMMARY

To address these and other problems with the conventional designs, systems and methods for locating an image recording of an object are provided. A first embodiment of the invention relates to a method, in particular a computer-implemented method, of locating an image recording of an object, in particular of the Earth or of another natural or artificial celestial body or of a surface portion thereof, recorded by at least one imaging recording device from a distance, wherein the method comprises: (i) acquiring image data which represent the image recording and its point in time of recording; (ii) acquiring measurement data which represent, for the point in time of recording, a respective measurement signal of a sensor device which is arranged in a surface portion of the object, captured by the image recording, at a location with known location information and which is configured to detect electromagnetic radiation which is incident on the sensor device from an optical path located between the object and the sensor device, and to generate the measurement signal as a function of the radiation detected in the course of this; (iii) matching the image data and the measurement data, wherein an image of a medium which is at least partially located in the optical path of the electromagnetic radiation, which image is represented by the image data, is compared with an image of the medium, which image is represented by the measurement data, in order to identify, with respect to their respective image content, mutually corresponding image portions of the two images; and (iv) locating the image recording with respect to the object by (iv-1) a determination of a position in the image recording which corresponds to the location of the sensor device on the basis of the matching, and (iv-2) an associating of the location information with this position.

As has already been mentioned in the introduction, the distance between the recording device and the recorded object can be greater than a few hundred meters or a few kilometers, as is usual for example in the case of aerial photographs, or can even, as in the case of images taken with the aid of a spacecraft, such as satellite photographs, in particular be greater than 100 km.

In this application, an "acquiring" of data, such as for example image data or measurement data, is intended to be understood to mean (i) that the data concerned is received as such, for example via a data interface of a device carrying out the method, or (ii) that the data is generated, in particular by a suitable sensor arrangement, such as for example an image recording device (camera) in the case of image data, or (iii) that the data is generated in an artificial manner, in particular within the framework of a simulation or on the basis of a mathematical model. Mixed forms of two or more of these possibilities are also conceivable, for example those in which part of the data is received while another part of the data is first generated in a sensor-based manner or by a simulation.

In this application, a "medium" is intended to be understood to mean a quantity of matter which, in accordance with its kind, quantity and density, is capable of blocking or modifying, in particular absorbing, scattering or reflecting, electromagnetic radiation in the wavelength range on which the measurement is based, so that the presence of the medium in the optical path between the recording device and the sensor device can have an influence on the intensity, the phase and/or the wavelength of the radiation arriving at the sensor device. In particular, such a medium may be a cloud in the atmosphere of a celestial body, in particular a planet, which serves as the object. In this context, the cloud may be a conventional cloud of water vapor or water ice ("weather cloud"), or it may however also be a cloud of smoke, such as for example a cloud of smoke resulting from a combustion, or a volcanic ash cloud, or a cloud of dust or a cloud of sand (such as for example in a sand storm).

In this application, an "image" of the medium in the image data is intended to be understood to mean an image region of the image recording represented by the image data, which image region at least partially represents the medium. For example, a medium in the form of a conventional weather cloud in the visible wavelength range can be represented on the image recording by appropriate coloring, for example as a white or a gray area. In this context, false color images are also possible.

In this application, an "image" of the medium in the measurement data is intended to be understood to mean an area on the surface portion in which at least one of the sensor devices is located, wherein the measurement data which are supplied by the latter indicate the measurement of an attenuation, in particular a reduction in intensity, caused by the medium, of the electromagnetic radiation, in particular solar radiation, which is incident on the sensor device. The surface area thus lies in a "shadow" caused by the medium.

In this application, image components of the two images respectively represented in the image data and in the measurement data "correspond" to each other with respect to their respective image content if each of the image components (image portions or pixels of the image recording or, respectively, measurement values of the sensor device or sensor devices) which correspond to each other either both represent the presence or, instead, both represent the absence or the lack of a (partial) image of the medium in the respective image component.

The location information can be defined by suitable coordinates in a global or local coordinate system which is defined in relation to the object or its surface or a portion thereof. In the case of the Earth as the object, in particular conventional geographic coordinate systems can be used for this purpose, preferably those which, in addition to angular coordinates (e.g., longitude and latitude coordinates), also use height coordinates (such as height above sea level) in order to define the location of a place on the surface of the object.

The terms "encompasses," "includes," "incorporates," "comprises," "has," "with," or any other variation of these, as may be used herein, are intended to also cover an inclusion which is not exclusive. In line with this, for example a method or a device that includes or comprises a list of elements is not necessarily limited to those elements, but may include other elements which are not specifically listed, or which are inherent in such a method or in such a device.

Furthermore, unless explicitly stated to the contrary, "or" refers to an inclusive or and not an exclusive "or." For example, a condition A or B is satisfied by any one of the following conditions: A is true (or present) and B is false (or not present), A is false (or not present) and B is true (or present), and both A and B are true (or present).

The terms "a" or "an," as they are used herein, are defined in the sense of "one or more." The terms "another" and "a further," as well as any other variant of these, are intended to be understood in the sense of "at least one further."

The term "plurality of," as it may be used herein, is intended to be understood in the sense of "two or more."

In this application, the terms "configured" or "set up" to perform a particular function, (and respective variations of these) as they may be used herein, are intended to be understood in the sense that the corresponding device is already present in a configuration or setting in which it can carry out the function, or at least that it can be adjusted—i.e., that it can be configured—in such a way that it can perform the function after a corresponding adjustment has been made. In this context, the configuration can be carried out, for example, by a corresponding setting of parameters of a process sequence or of switches or the like for activating or deactivating functionalities or settings. In particular, the device may have a plurality of predetermined configurations or modes of operation, so that the configuring can be carried out by a selection of one of these configurations or modes of operation.

In the method in accordance with the first embodiment, by matching the image data and the measurement data, it is possible for an at least partial compensation of optical distortions, which typically arise in connection with a 2D image recording of a curved surface of a 3D object, such as for example the surface of the Earth, to be achieved in a simple manner, and thus it is also possible for the achievable accuracy of the locating of the image acquisition to be improved.

In the following, certain example embodiments of the method will be described, each of which, as far as this is not expressly excluded or technically impossible, can be combined in any desired manner with one another, as well as with the further other embodiments of the invention which are described herein.

In some embodiments, the recorded image data comprise, for different points in time of recording, a respective digital image recording of at least one surface portion of the object in which the sensor device is located. Further, the method is carried out with multiple iterations in such a manner that: (i) different iterations each correspond to a different one of the points in time of recording (which may be done, in particular, in such a way that the iterations are ordered in accordance with the sequence, in terms of time, of the points in time of recording); (ii) in each iteration, only those pixels of the digital image recording are retained for the further processing in the respective next iteration for which, in the respective current iteration and, if applicable, in all preceding iterations, within the framework of the matching of the image data and the measurement data for the associated point in time of recording and the sensor device, a match has been found with regard to the respective image contents with respect to a presence or absence, respectively, of a medium, which may be present in the optical path at the respective point in time of recording; and (iii) after a certain final iteration, the position of the sensor device in the image recording is determined on the basis of at least one of the pixels still remaining up to that point in time. Accordingly, the successive iterations act in a manner similar to a filter with respect to the pixels, so that, as a rule, the number of pixels still remaining is gradually reduced to such an extent that, on the basis of the pixel or pixels which still remain after the final iteration, as well as the known location information for the sensor device, a locating of the sensor device in the digital image recording and thus also a locating of the image recording as such in a global or local coordinate system can be carried out with a high degree of accuracy.

As a criterion for determining whether a particular pixel in the image data represents the presence or the absence of an image of a medium, in particular an intensity or brightness and/or a color assigned to the pixel by the image data can be used. As a criterion for determining whether the measurement data indicate the presence or the absence of the medium, in particular an intensity or brightness and/or color or wavelength of the detected electromagnetic radiation (in particular in the visible spectral range) detected by the sensor device can be used. In particular if dust clouds, sand clouds or ash clouds are to serve as the medium, image data which represent image recordings in the wavelength range of radar radiation (radio frequency range, e.g., millimeter waves or centimeter waves), can also be used in addition to, or instead of, image data which represent image recordings in the visible spectral range.

In some of the embodiments which are based on an iteration, the final iteration is determined as one of the following: (i) the last iteration after which at least m pixels, in particular m contiguous pixels, remain, where m≥1; (ii) the kth iteration after which at least m pixels, in particular m contiguous pixels, remain, where m and k are natural numbers and m≥1, k>1. In this way, it can be ensured, on the one hand, that after the final iteration at least a number of pixels defined by the parameter m is present, on the basis of which the locating of the sensor device in the digital image recording and thus also of the image recording as such can be carried out. Option (ii) also ensures that the number of iterations is limited in an absolute manner, which can become relevant if, in the case of several successive iterations, the reduction of the pixels progresses only slowly in the course of the iteration due to a constellation of the recording device and the medium that hardly changes over time. In this way, by a suitable choice of the parameters m and k, a respectively (currently) desired compromise between speed and accuracy of the locating can be defined, in particular in a variable manner.

In some embodiments, when, on the basis of the image data and/or the measurement data, the presence of a radiation attenuating medium in the optical path is detected, the radiation which is incident on the sensor device is subjected to a spectral analysis in order to infer the type of the matter which is present in the medium. Since different media (such as for example water vapor, water droplets, exhaust gases from aircraft, volcanic ash, sand or dust) typically cause different optical spectra, in particular absorption spectra, of the radiation detected at the sensor device, conclusions can be drawn in this way as regards the nature of the medium, in particular of one or more of the types of matter contained therein, and preferably also as regards their relative abundance or concentration.

In some embodiments, the locating of the image recording further comprises determining at least one further item of location information for a further selected position in the image recording as a function of the position determined for the sensor device and its associated known location information. In this way, a locating for further positions on the image recording can be carried out, in particular in such a way that, by a set of a plurality of such additionally determined positions, a coverage of the image recording is achieved in such a way that none of the pixels is more than a predetermined distance away from at least one of the pixels which has been located.

In some embodiments, the method further comprises: using data which represent the image recording which has been located, including the associated location information, as input data for one or more meteorological models in order to generate a weather forecast based thereon for at least a partial area of the surface portion of the object covered by the image recording, and to generate, and make available, weather forecast data which represent this weather forecast. Due to the high accuracy that can be achieved in accordance with the method in the locating of image recordings, in particular of weather satellite images, the weather events that can be detected on the image recordings in each case, such as for example types of cloud and formations and, when considering a temporal sequence of image recordings, also of the dynamics of such clouds, can thus be located with high accuracy, which can promote an improvement in the forecast quality and forecast reliability of weather forecasts based thereon. This may be relevant in connection with weather forecasts for regions which have a highly heterogeneous surface structure or prominent surface features (e.g., mountains, rivers, lakes or coasts of the sea).

In particular, in some of these embodiments, the method may further comprise controlling or configuring a technical device or a technical system as a function of the weather forecast data. In this context, the controlling or configuring may be carried out with respect to one or more functionalities or configuration options of the following technical devices or the following technical system: (i) a facility or a system for the manufacture of products; (ii) a facility or a system for the generation of electrical energy (e.g., weather-dependent control of a power plant); a distribution network for energy (e.g., a smart grid or a canal system for hydroelectric power plants); (iii) a transport route or a transport network (e.g., a railroad track or a rail network or a road or a road network with controllable traffic infrastructure, such as for example signaling installations or devices for the display of information); (iv) a vehicle or a group of vehicles which are to be moved together in a coordinated manner (e.g., for example, the power consumption of electric locomotives is often dependent on the temperature and thus on the weather.

In some embodiments, the matching of the image data and of the measurement data is carried out using a method which is based on machine learning, with the image data and the measurement data being used as input data. In particular, one or more artificial (trained) neural networks may be used in order to achieve a classification of pixels of the image recording or image recordings as to whether they (also) image the location at which the sensor device is located. In this context, in particular the image data, the measurement data, as well as one or more criteria on the basis of which it can be determined, for a pixel, whether its pixel value indicates the presence or the absence of a medium, can be supplied to the neural network or neural networks as input data.

In some of these embodiments, the weather forecast data for a specific forecast period together with actual measured weather data corresponding thereto are used as training data or validation data for the further training or validation of the method based on machine learning. For example, in particular training in the sense of supervised learning can be carried out in advance or on an ongoing basis in order to prepare or further optimize the at least one neural network for its use.

In some embodiments, at least one classification criterion is made available to the method based on machine-learning as a (further) input variable, on the basis of which, if applicable, an image of the medium represented in the image data as well as in the measurement data can be classified in accordance with its type. In particular, the classification can relate to the type and/or the amount and/or the concentration of matter contained in the medium. For example, the classification criterion can be defined in such a way that the reflection or absorption of electromagnetic radiation by the medium at different wavelength ranges is taken into account, so that, with this, it becomes possible, with the aid of the method, to distinguish between clouds of matter which are characterized by different reflection properties or absorption properties, such as for example water vapor clouds, rain clouds, ice clouds, sand clouds and dust clouds or ash clouds, at least in pairs.

In some embodiments, the method is carried out with respect to a plurality of sensor devices which are located at different locations on the object. In addition, the locating of the image recording is carried out in a corresponding manner on the basis of the determination of the positions in the image recording which correspond to the respective locations of the sensor devices by the matching and the associating of the respective location information of the sensor devices to the position respectively determined for them. In this way, the locating of the image recording is based on the determination of several positions, so that the accuracy which can be achieved for the locating of the image recording can be further increased, in particular also with regard to its orientation. In particular, a locating of the image recording can be achieved by the application of an optimization method on the basis of the various determined positions, which optimization method may be defined in such a way that it minimizes the sum of the deviations (summed over the various sensor devices), if any, in each case between a pixel which images the location of an associated sensor device and a pixel (which may possibly be a different pixel) which corresponds to the known location information for this sensor device on the image recording which has been located.

In some embodiments, at least one of the sensor devices comprises a solar installation with which the respective associated measurement signal is generated as a function of the electrical energy which is generated by the solar installation at the respective point in time of recording. In particular, the solar current generated by the solar installation or a variable which is dependent thereon can thus serve as the measurement signal. Since solar installations are distributed in many places in many regions of the world, existing infrastructure can thus be made use of for the generation of the measurement data, the exact location of which is in general also known in advance and is often even officially registered.

In some embodiments, the acquiring of the image data comprises the acquiring of image material in relation to the object which image material has been generated by a recording device which is carried by an aerial vehicle, a space vehicle or a satellite. The aerial vehicle may be a manned aircraft or an (unmanned) drone. As regards satellites, this may be, in particular, weather satellites, earth observation satellites or planetary observation satellites or space stations, in particular manned space stations.

A second embodiment of the invention relates to a device for locating an image recording of an object, in particular of the Earth or of another natural or artificial celestial body or of a surface portion thereof, recorded by at least one imaging recording device from a distance, wherein the device is configured to carry out the method in accordance with the first embodiment.

A third embodiment of the invention relates to a computer program or to a non-volatile computer readable storage medium which comprises instructions which, when they are being executed on a computer or on a multi-computer platform, in particular on the device in accordance with the second embodiment, cause the computer or the multi-computer platform to carry out the method in accordance with the first embodiment.

The computer program may be stored on a non-volatile data carrier. Preferably, this is a data carrier in the form of an optical data carrier or a flash memory module. This may be advantageous if the computer program as such is to be traded independently of a processor platform on which the one or more programs are to be executed. In a different implementation, the computer program may be provided as a file on a data processing unit, in particular on a server, and can be downloaded via a data connection, for example the Internet, or a dedicated data connection, such as for example a proprietary or a local network. In addition, the computer program may comprise a plurality of interacting, individual program modules. In particular, the modules may be configured or, in any case, may be usable in such a way that they can be executed in the sense of distributed computing on different devices (computers or processor units) which are geographically spaced from one another, and which are connected to one another via a data network.

Accordingly, the computer or the multi-computer platform or the device in accordance with the second embodiment may comprise one or more program memories in which the computer program is stored. As an alternative, the computer or the multi-computer platform or the device may also be set up to access a computer program which is available externally, for example on one or more servers or other data processing units, via a communication link, in particular in order to exchange with it data which are used during the course of the method or during the execution of the computer program or which represent outputs of the computer program.

Thus, the device in accordance with the second embodiment may in particular be a computer or a multi-computer platform, in particular comprising a plurality of computers which are interconnected by a network, which computer or multi-computer platform is configured, by one or more computer programs in accordance with the second embodiment, to carry out the method in accordance with the first embodiment in order to thereby locate one or more image recordings of an object which have been recorded from a distance, in particular from a great distance, by at least one imaging recording device.

The features and advantages which have been explained in relation to the different embodiments can include any combinations and sub-combinations of the described embodiments.

BRIEF DESCRIPTION OF THE DRAWINGS

Further advantages, features and possible applications of the present invention will be apparent from the following detailed description in connection with the drawings. The accompanying drawings, which are incorporated in and constitute a part of this specification, illustrate one or more embodiments of the invention and, together with the general description given above and the detailed description given below, explain the one or more embodiments of the invention.

DETAILED DESCRIPTION

In the figures, the same reference signs are used throughout for the same or for mutually corresponding elements of embodiments of the invention.

Figure 1:
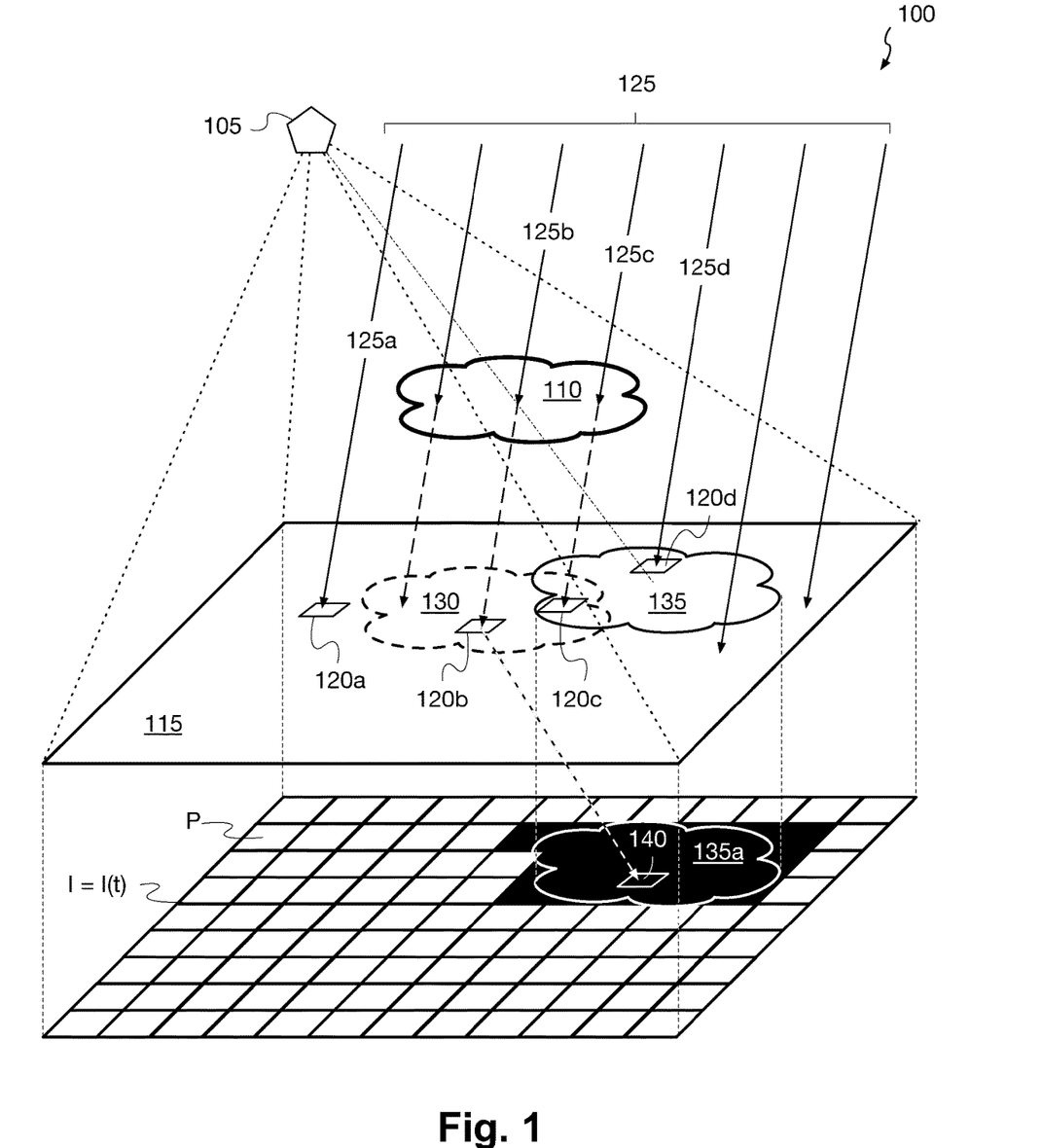
FIG. 1 is a schematic view of an example scenario for an acquisition of image recordings and radiation measurement values in a sensor-based manner, for use within the framework of the method in accordance with embodiments of the invention for locating image recordings.

FIG. 1 illustrates an example scenario 100, against the background of which example embodiments of the method in accordance with the invention are to be explained in the following with reference to the other figures.

The scenario 100 is an Earth observation scenario in which a surface portion 115 of the surface of the Earth is photographed from a satellite-based or an aircraft-based recording device 105 in order to generate, at a point in time t, an image recording I=I(t) (shown offset in the lower part of FIG. 1 for illustration purposes), which images the surface portion 115. The image recording I is a digital two-dimensional image recording which comprises a matrix-shaped grid of pixels P.

Between the recording device 105 and the surface portion 115 there is a medium 110, which may be a cloud in the atmosphere of the Earth. The cloud may be a conventional "weather cloud," which consists substantially of water droplets and/or ice crystals, or however it may be a dust cloud, a sand cloud (e.g., as a result of a sand storm), or an ash cloud (e.g., as a result of a volcanic eruption). In the following, it is assumed that the medium is a conventional weather cloud. Accordingly, the image recording I shows an image 135 of the medium 110. Such image recordings are known from weather images which have been generated in a satellite-based manner.

Due to its composition, the medium 110 has the property of attenuating or even completely blocking electromagnetic radiation 125, at least in certain wavelength ranges, for example visible light, in particular by absorption, scattering and/or reflection. Therefore, when there is solar radiation 125, the presence of the medium results in a shadow 130 on the surface portion 115. Sun rays 125a to 125d are indicated here by way of example as part of the radiation 125, wherein the portions of the sun rays represented by dashed lines are intended to indicate the attenuation, in particular the intensity reduction, caused by the medium 110. Since the distance of the sun from the surface of the Earth is very large, it can be assumed, as is shown here, in a good approximation by way of modeling, that the sun rays run essentially parallel to each other (whereby scattering effects in the atmosphere of the Earth are neglected here).

Sensor devices 120a to 120d for electromagnetic radiation are located in various different places on the surface portion 115, whereby these may be solar installations. In particular, the measured solar current of the respective solar installation can then be used as a measurement signal for the intensity of the solar radiation 125 which is irradiated onto the respective solar installation. If a solar installation is located in the shadow 130 of the medium 110, its solar current will be lower the stronger the attenuation is which is caused by the medium 110 (but not necessarily in accordance with a linear relationship). On the other hand, the solar current is higher in the absence of the medium 110, or when the solar installation is not located in the shadow 130, up to a maximum value which is determined by the design. Thus, the measurement of the solar current can be used to infer the presence of the medium 110 in the path of the light (optical path) between the sun and the solar installation. Therefore, in the example of FIG. 1, the solar installations 120a and 120d which are not located in the shadow of the medium 110 will produce a higher solar current relative to their respective maximum value than the solar installations 120b and 120c that are located in the shadow 130. The measurement data of the sensor devices or solar installations 120b and 120c which are located in the shadow 130 thus represent (at least in a section-wise or point-wise manner) the shadow 130 and thus an image of the medium 110.

Since the direction from which the image recording I is acquired by the recording device 105 does not, as a rule, coincide with the direction of incidence of the solar radiation 125, the position of the image 135 and of the shadow 130 of the medium 110 do not usually coincide when the position of the shadow 130 is transferred into the image recording I within the framework of a comparison.

Within the framework of a transformation, the transformation parameters of which can be found within the framework of an optimization problem, in which the image of the shadow 130 in the image recording and of the image 135 of the medium 110 are optimally superimposed, are determined. It is also possible to geometrically calculate, at least approximately, the transformation parameters from a position of the recording device 105 at the point in time t, which position may possibly be known in advance, as well as the imaging angle used to generate the image recording relative to the surface portion 115, as well as the position of the sun. The respective position of the sensor devices 120a to 120d can then be transformed into the image recording on the basis of the transformation parameters which have been determined. This is illustrated, by way of example, for the sensor device 120b in FIG. 1, whereby, since it is located in the shadow 130, it is correspondingly located in the image region of the image recording I which is occupied by the image 135a of the medium. Here, the corresponding pixels which represent the image 135a are marked in black for the purpose of illustration. Such a transformation can be used within the framework of the method, which is described in the following, by way of example, with reference to FIGS. 2 and 3.

Figure 2:
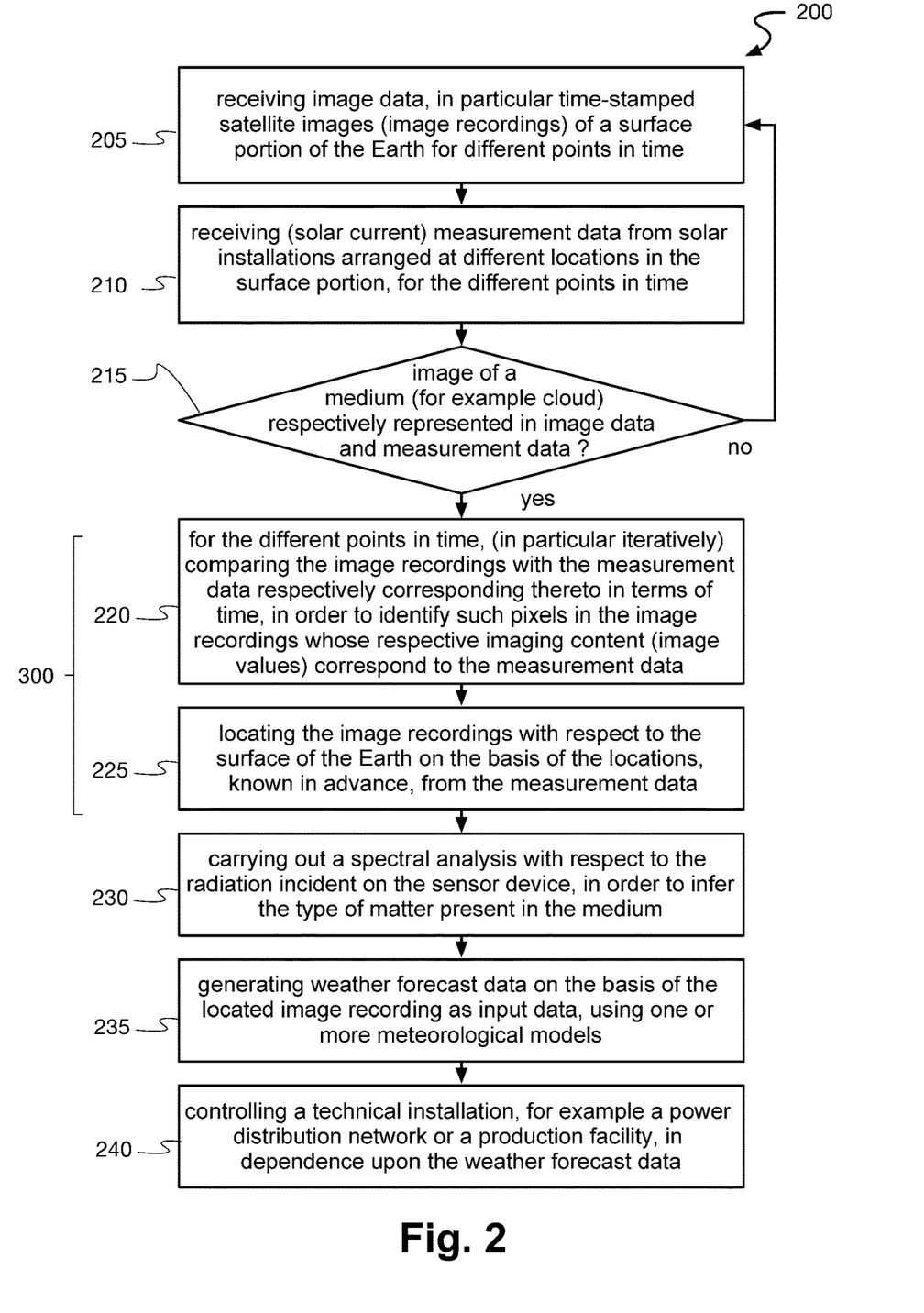
FIG. 2 is a schematic flowchart illustrating a preferred embodiment of the method in accordance with embodiments of the invention.

FIG. 2 shows an example embodiment 200 of a method in accordance with an embodiment of the invention for locating one or more image recordings, which is explained in the following, in particular also with reference to FIG. 1, by way of example.

In the method 200, in a step 205, image data are received that may represent, in particular, a plurality of image recordings which have been taken by the satellite-based or aircraft-based recording device 105, each of which image recordings images the same surface portion 115 of the Earth at different points in time $t_i$ where i=1, 2, 3, . . . .

Furthermore, in the method 200, in a step 210, measurement data $S_i:=S(t_i)$ of the sensor devices 120a to 120d, in particular solar installations, which are arranged at different locations in the surface portion 115, are received for the different points in time $t_i$. The receiving of the image data $I_i:=I(t_i)$ and of the measurement data $S_i$ may take place, in particular, via a data interface that may be used to supply the data $I_i$ and $S_i$ to a computer or to a multi-computer platform that carries out the method 200 or is meant to carry out the method 200.

In order to avoid, from the outset, a possible later failure (run into nothing) of the method 200 in the case of the absence of a medium 110, a check is carried out in a further step 215 as to whether an image 135 or a shadow 130 of a medium 110 (for example a cloud) is respectively represented in the image data $I_i$ as well as in the measurement data $S_i$. If this is not the case (215—no), then the method branches back to the step 205. Otherwise (215—yes), in a step 220, for each point in time $t_i$, a comparison of the respective image recording $I_i$ with the measurement data $S_i$, respectively corresponding to this, of a specific sensor device, e.g., the sensor device 120b, is carried out in order to determine which pixels P in the image recording $I_i$ correspond to the measurement data $S_i$ with regard to their image content or their respective pixel value (cloud represented, or no cloud represented).

Such a correspondence occurs for a point in time $t_i$ if a correspondence is established with regard to the presence or the absence of a respective image, represented in the image data $I_i$ as well as in the measurement data $S_i$, of a medium 110 which may possibly be present in the optical path at the respective point in time of recording. This is the case if the pixel which has just been examined belongs to an image 135a of the medium 110 in the image recording $I_i$ and, at the same time, a reduced solar current has been measured at the sensor device 120b which reduced solar current can be attributed to the presence of the medium 110, i.e., if this sensor device 120b is located in the shadow 130 (i.e., in the image of the medium 110 represented by the measurement data $S_i$). However, the reverse is also true if the pixel does not belong to the image 135 and a location of the sensor device 120b in the shadow 130 cannot be inferred from the solar current.

In accordance with a possible embodiment, in order to determine such a correspondence, in particular the transformation of the position of the sensor device 120b under consideration into the image recording $I_i$, which has already been mentioned above, can be carried out, so that it can be checked directly whether the position of the sensor device 120b is located within the perimeter of the image of the medium in the image recording $I_i$.

With the aid of the correspondence check, it is possible for those pixels to be identified in the respective image recording $I_i$ which are valid candidates for (also) imaging the location of the sensor device 120b on the surface portion 115 in this image recording. In particular, the matching may be performed in an iterative manner on the basis of the image data $I_i$ and measurement data $S_i$ which have been obtained at different points in time $t_i$, where i=1, 2, 3, . . . . Such iterative matching 300 will be explained in greater detail below with reference to FIGS. 3 and 4.

When the matching has been carried out in step 220, the image recordings can be located with respect to the surface of the Earth on the basis of the pixels which have been identified within the framework of the matching process and which correspond to the measurement values. For this purpose, the locations, known in advance, of the measurement devices (or solar installations) from the measurement data are used. For example, if, in a simple case, a single pixel of an image recording has been identified as a representative of a particular solar installation, then the location, known in advance, of this solar installation can be assigned to this pixel. This can be carried out in particular with respect to different pixels and correspondingly with respect to different assigned locations or solar installations, so that the locating can be carried out on the basis of different pixels, which is advantageous in order to determine, with good accuracy, not only a position, but also an orientation or an alignment of the image recordings relative to the surface of the Earth.

Further, a step 230 may be provided in which a spectral analysis is carried out with respect to the radiation which is incident on the sensor devices to infer the type of matter present in the medium. Thus, for example, on the basis of the spectral analysis, it is possible to determine, on the basis of a spectrum characteristic of the matter, whether the medium is a conventional weather cloud (water vapor or water ice crystals), a (volcanic) dust cloud or a sand cloud, or, for example, smoke from a combustion process, for example in an industrial plant.

On the basis of the image recordings, located in the step 225, as input data, it is now possible to generate weather forecast data in a step 235, in particular for the surface portion 115 covered by the image recordings, using one or more meteorological models, and the weather forecast data can be used in a further step 240, in particular for controlling a technical installation, such as for example a power distribution network or a production facility or a transport network. For example, in a rail network for railroads, heating of critical infrastructure, such as for example switches, can take place on the basis of temperature profiles predicted within the framework of the weather forecast data at the respective locations of such infrastructure. Also, the power demand for the operation of trains with electric locomotives or railcars, which, as a rule, is dependent on the temperature, can be predicted and a corresponding control of a rail-related power supply infrastructure can be planned and implemented accordingly.

Figure 3:
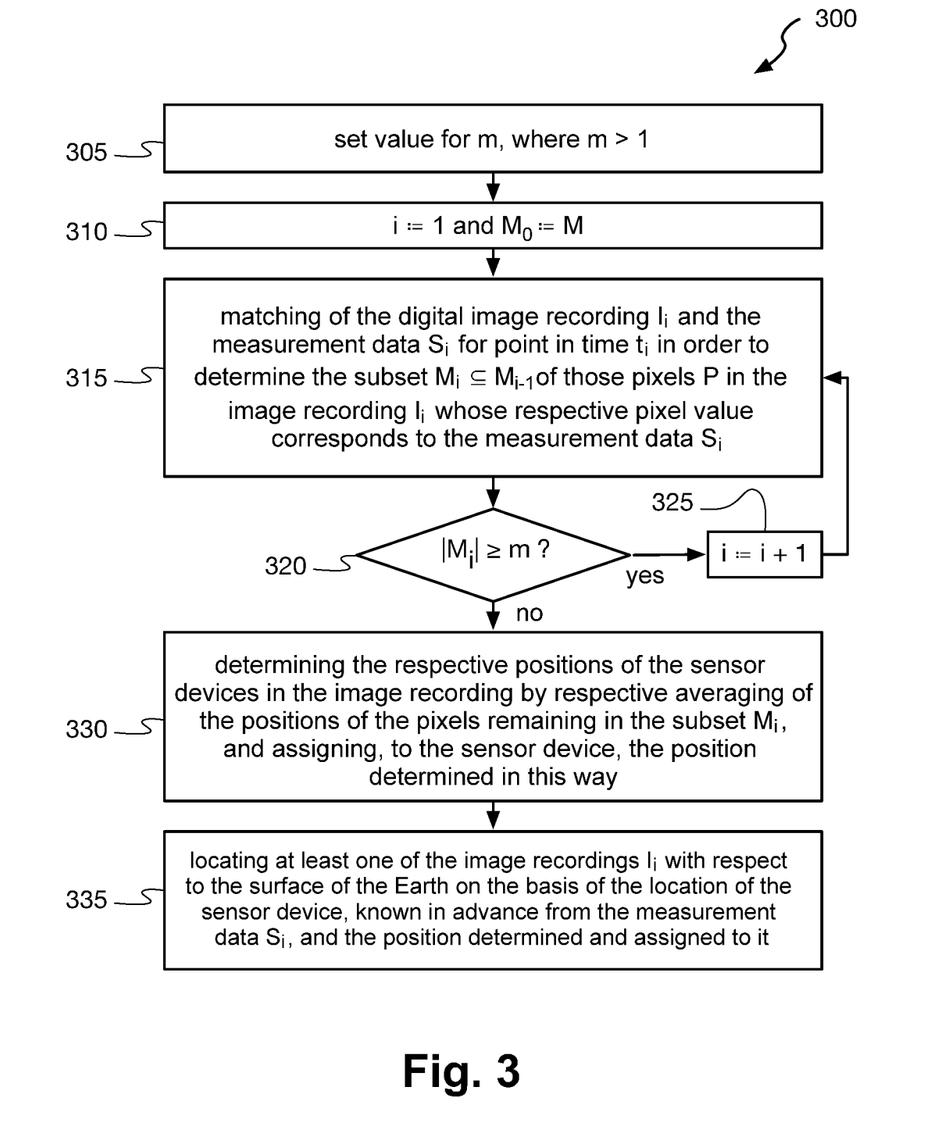
FIG. 3 is a schematic flowchart illustrating, in more detail, an iterative image evaluation within the framework of a preferred embodiment of the method of FIG. 2.
Figure 4:
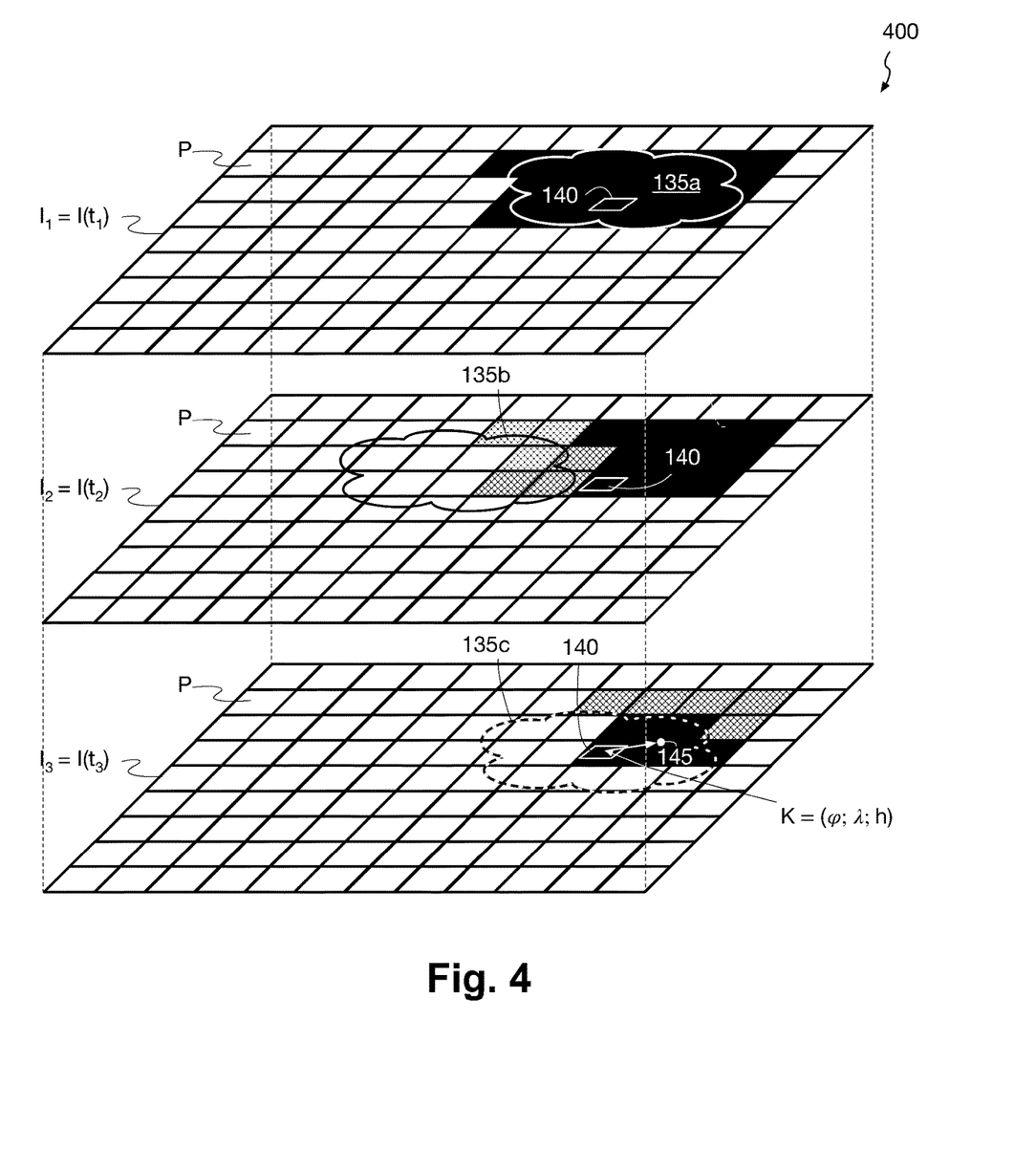
FIG. 4 is a schematic view showing an example temporal sequence of image recordings and their evaluation within the framework of an example embodiment of the method in accordance with embodiments of the invention based on an iterative image evaluation, in particular in accordance with the method from FIGS. 2 and 3.

A specific example embodiment of the interactive matching process 300 as part of the method 200 is illustrated in FIGS. 3 and 4. Here, in a step 305, the value of a parameter m>1 is first set in order to set a termination criterion for the iteration.

In a step 310, which can also coincide with the step 305, on the one hand a starting value i:=1 is further set for an index i for the purpose of identifying different points in time, in particular points in time which are successive with increasing value of i, for the generation of the image recordings and measurements, and on the other hand an initial set of pixels $M_0$ is set for a first digital image recording $I_1$. The set of pixels $M_0$ can be equal to the set M of all pixels P of the image recording $I_1$ in accordance with the present example.

A temporal sequence 400 of image recordings and their interactive image evaluation is illustrated in FIG. 4, wherein each of the pixels P are shown as pixels of a pixel matrix which represents the respective image recording $I_i$ for the respective one of three successive points in time $t_i$ with i=1, 2 and 3, respectively.

Now the first run of the iteration in the matching process 300 can take place with the starting value i=1. In this context, a matching of the first digital image recording $I_1$ with the measurement data $S_1$ for the same (point in time of recording or point in time of measurement $t_1$) is carried out in the step 315, whereby it is determined within the framework of a check which of the pixels in the image recording $I_1$ have a pixel value that corresponds to the measurement data $S_1$ (in connection with this, see the preceding explanations for FIG. 2). Those pixels P for which this is the case form the set $M_1$ as a subset of $M_0$, and they are colored black in FIG. 4, since the case is illustrated here that the sensor device 120b specifically considered here supplies measurement data from which the presence of a medium 110 in the optical path can be inferred. In FIG. 4, the image 140 of the sensor device 120b is again shown as having been transformed into the image recording, while the image of the medium 110 in this image recording $I_1$ is indicated by the reference sign 135a. The pixels of the FIG. 135a which are shown in black are therefore such pixels P which (also) image the medium 110, which is shown here as a cloud, which can be done by a respective image value which corresponds to a lower brightness than is the case with pixels which do not (also) image the medium.

In accordance with the flowchart of FIG. 3, a check is now carried out in a further step 320 as to whether the remaining number of (black) pixels, i.e., the number of elements $|M_1|$ of the set $M_1$, is greater than, or equal to, the parameter m. If this is the case (320—yes), the index i is incremented in the step 325 and, within the framework of the iteration, the next run is started by carrying out step 315 again. The course of this iteration and, if applicable, of each further iteration corresponds to the course which has been described above for the first iteration.

If, on the other hand, the termination criterion is met after one of the iterations (320—no), in the step 330 the respective position of each sensor device in the image recording is determined by a respective averaging of the positions of the pixels P remaining in the subset $M_i$ after the last run of the iteration. The position determined in this way is then assigned to the sensor device as the position in the image recording or in the image recordings. In accordance with this, in a further step 335, at least one of the image recordings $I_i$ can be located with respect to the surface of the Earth on the basis of the location of the respective sensor device, which is known in advance from the measurement data $S_i$, and the position which has been determined and assigned to it in the step 330.

Now referring again to FIG. 4, it can be seen in the image recording $I_2$ for the point in time $t_2$ that at this point in time the medium 110 has migrated relative to the image recording and is partially represented, as image 135b, by other pixels. The sensor device 120b is now no longer in the shadow of the medium, i.e., it measures a correspondingly high solar current as a measurement signal. Accordingly, after the second iteration, only those pixels in the pixel matrix are to be considered as candidates for the position of the sensor device 120b (set $M_2$), which, in $I_1$, (also) image the medium 110 (set $M_1$) and which, in the image recording $I_2$, do not (also) image the medium 110. In FIG. 4, these remaining pixel candidates in $I_2$ are colored black, while the candidates that have dropped out compared to $I_1$ are represented by hatching in this figure.

In the third iteration illustrated in FIG. 4, the medium 110 has migrated further, so that, in image recording $I_3$, it is again shown, as image 135c, at a different position in the pixel matrix. Now, the measurement signal or, respectively, the measurement data of the sensor device 120b again provide a reduced solar current, which means that a coverage (shadowing) by the medium 110 can be inferred. Now, after the third iteration, only those pixels (colored black in $I_3$) remain as candidates (set $M_3$) which, on the one hand, remained as pixel candidates after the second iteration (set $M_2$) and, on the other hand, at the same time (also) image the image 135c in $I_3$.

Since the third iteration in the present example at the same time represents the last iteration (final iteration), after which the termination criterion in the step 320 is fulfilled (320—no), a position of the sensor device 120b in the image recording $I_3$ is now determined from the pixels remaining in the set $M_3$ by calculating the center of gravity 145 of this pixel distribution, in particular the geometric center of gravity 145 of this pixel distribution. It is located by assigning to it the location position K on the surface of the Earth, which is known in advance for this sensor device from the measurement data and which can be represented by corresponding coordinates, for example a longitude $\varphi$, a latitude $\lambda$ and an altitude h above sea level.

Figure 5:
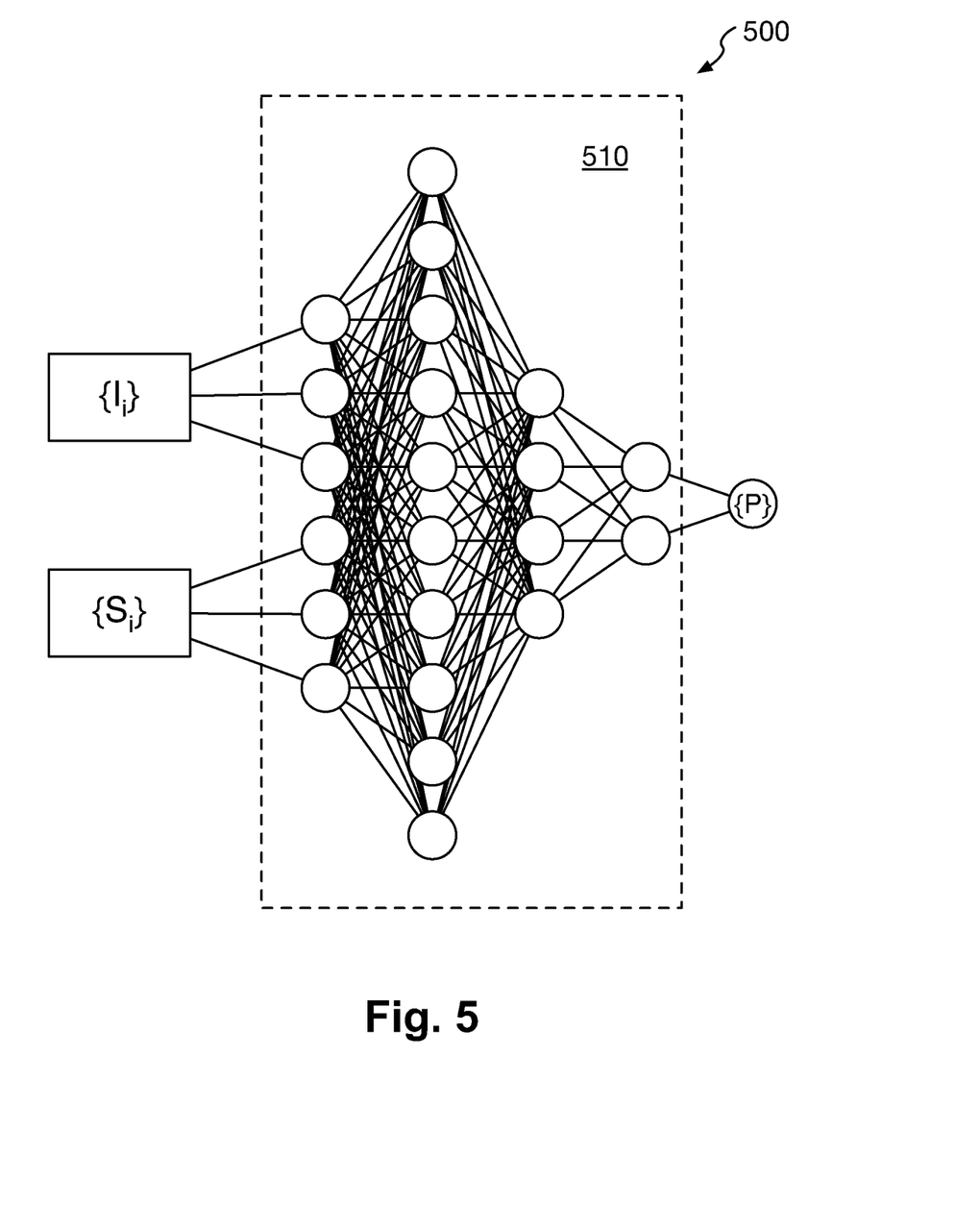
FIG. 5 is a schematic diagram illustrating an evaluation which is based on machine learning, in particular on the basis of an artificial neural network, of an image recording and of corresponding measurement data acquired by a sensor device for the purpose of determining one or more pixels which represent the position of the sensor device in the image recording, or which (also) image the position of the sensor device in the image recording.

FIG. 5 schematically shows a diagram 500 for the purpose of illustrating the principle of an evaluation, on the basis of machine learning, on the basis of an artificial neural network 510 (by way of example), of a set $\{I_i\}$ of image recordings and of a corresponding set of measurement data $\{S_i\}$ acquired by a sensor device, for a set $\{t_i\}$ of points in time of recording and, respectively, points in time of measurement $t_i$ for the determination of a set $\{P\}$ of one or more pixels P which can be considered as candidates for representing the position of the sensor device in the image recordings, i.e., which (also) image this sensor device.

While at least one example embodiment has been described above, it is to be noted that a large number of variations thereto exist. In this context it is also to be noted that the example embodiments described herein only illustrate non-limiting examples, and that it is not intended thereby to limit the scope, the applicability, or the configuration of the devices and methods described herein. Rather, the preceding description will provide the person skilled in the art with instructions for the implementation of at least one example embodiment, whereby it is to be understood that various changes in the functionality and the arrangement of the elements described in an example embodiment can be made without thereby deviating from the subject matter respectively set forth in the appended claims as well as legal equivalents to this.

What is claimed is:

1. A method of locating an image recording of an object, recorded by at least one imaging recording device from a distance, wherein the method comprises:
   acquiring image data which represent the image recording and a point in time of recording;
   acquiring measurement data which represent, for the point in time of recording, a respective measurement signal of at least one sensor device which is arranged in a surface portion of the object, captured by the image recording, at a location with a location information that is known and which in this context is configured to detect electromagnetic radiation which is incident on the sensor device from an optical path located between the object and the sensor device, and to generate the measurement signal as a function of the radiation detected;
   matching the image data and the measurement data, wherein a first image of a medium which is at least partially located in the optical path of the electromagnetic radiation, which image is represented by the image data, is compared with a second image of the medium, which image is represented by the measurement data, in order to identify, with respect to their respective image content, mutually corresponding image portions of the first and second images; and
   locating the image recording with respect to the object by a determination of a position in the image recording which corresponds to the location of the sensor device based on the matching, and an associating of the location information with this position.

2. The method of claim 1, wherein the recorded image data comprise, for different points in time of recording, a respective digital image recording of at least one surface portion of the object in which the sensor device is located; and the method is carried out with multiple iterations in such a manner that: different iterations each correspond to a different one of the points in time of recording;

in each iteration, only those pixels of the digital image recording are retained for the further processing in the respective next iteration for which, in the respective current iteration and in all preceding iterations, within a framework of the matching of the image data and the measurement data for the associated point in time of recording and the sensor device, a match has been established with regard to the respective image contents with respect to a presence or absence, respectively, of a medium, which may be present in the optical path at the respective point in time of recording; and after a final iteration, the position of the sensor device in the image recording is determined based on at least one of the pixels still remaining up to that point in time.

3. The method of claim 2, wherein the final iteration is determined as one of the following:

a last iteration after which at least m pixels (P) remain, where m≥1; and a kth iteration after which at least m pixels (P) remain, where m and k are natural numbers and m≥1, k>1.

4. The method of claim 1, wherein, when, based on the image data and/or the measurement data, the presence of a radiation attenuating medium in the optical path is detected, the radiation which is incident on the sensor device is subjected to a spectral analysis to infer a type of matter which is present in the medium.

5. The method of claim 1, wherein the locating of the image recording further comprises:

determining at least one further item of location information for a further selected position in the image recording as a function of the position determined for the sensor device and the location information.

6. The method of claim 1, further comprising:

using data which represent the image recording which has been located, including the location information, as input data for one or more meteorological models to generate a weather forecast based thereon for at least a partial area of the surface portion of the object covered by the image recording and to generate, and make available, weather forecast data which represent this weather forecast.

7. The method of claim 6, further comprising: controlling or configuring a technical device or a technical system as a function of the weather forecast data.

8. The method of claim 7, wherein the controlling or configuring is carried out with respect to one or more functionalities or configuration options of the following technical devices or the following technical system:

a facility or a system for the manufacture of products;
a facility or a system for a generation or distribution of electrical energy;
a distribution network for energy;
a transport route or a transport network; and
a vehicle or a group of vehicles which are to be moved together in a coordinated manner.

9. The method of claim 6, wherein the matching of the image data and of the measurement data is carried out using a method which is based on machine learning, with the image data and the measurement data being used as input data.

10. The method of claim 9, wherein the weather forecast data for a specific forecast period together with actual measured weather data corresponding thereto are used as training data or validation data for the further training or validation of the method based on machine learning.

11. The method of claim 9, wherein at least one classification criterion is made available to the method based on machine-learning as an input variable, based on which an image of the medium represented in the image data as well as in the measurement data can be classified.

12. The method of claim 1, wherein the method is carried out with respect to a plurality of sensor devices which are located at different locations on the object, and the locating of the image recording is carried out in a corresponding manner based on the determination of the positions in the image recording which correspond to the respective locations of the sensor devices by the matching and the associating of the respective location information of the sensor devices to the position respectively determined for them.

13. The method of claim 12, wherein at least one of the sensor devices comprises a solar installation with which the respective associated measurement signal is generated as a function of the electrical energy which is generated by the solar installation at the respective point in time of recording.

14. The method of claim 1, wherein the capturing of the image data comprises the capturing of image material in relation to the object which image material has been generated by a recording device which is carried by an aerial vehicle, a space vehicle or a satellite.

15. The method of claim 3, wherein, when, based on the image data and/or the measurement data, the presence of a radiation attenuating medium in the optical path is detected, the radiation which is incident on the sensor device is subjected to a spectral analysis to infer a type of matter which is present in the medium, wherein the locating of the image recording further comprises determining at least one further item of location information for a further selected position in the image recording as a function of the position determined for the sensor device and the location information, the method further comprising:

using data which represent the image recording which has been located, including the location information, as input data for one or more meteorological models to generate a weather forecast based thereon for at least a partial area of the surface portion of the object covered by the image recording and to generate, and make available, weather forecast data which represent this weather forecast;

controlling or configuring a technical device or a technical system as a function of the weather forecast data, wherein the controlling or configuring is carried out with respect to one or more functionalities or configuration options of the following technical devices or the following technical system:

a facility or a system for the manufacture of products;
a facility or a system for a generation or distribution of electrical energy;
a distribution network for energy;
a transport route or a transport network; and
a vehicle or a group of vehicles which are to be moved together in a coordinated manner, wherein the matching of the image data and of the measurement data is carried out using a method which is based on machine learning, with the image data and the measurement data being used as input data, wherein the weather forecast data for a specific forecast period together with actual measured weather data corresponding thereto are used as training data or validation data for the further training or validation of the method based on machine learning, wherein at least one classification criterion is made available to the method based on machine-learning as an input variable, based on which an image of the medium represented in the image data as well as in the measurement data can be classified, wherein the method is carried out with respect to a plurality of sensor devices which are located at different locations on the object, and the locating of the image recording is carried out in a corresponding manner based on the determination of the positions in the image recording which correspond to the respective locations of the sensor devices by the matching and the associating of the respective location information of the sensor devices to the position respectively determined for them, wherein at least one of the sensor devices comprises a solar installation with which the respective associated measurement signal is generated as a function of the electrical energy which is generated by the solar installation at the respective point in time of recording, and wherein the capturing of the image data comprises the capturing of image material in relation to the object which image material has been generated by a recording device which is carried by an aerial vehicle, a space vehicle or a satellite.

16. A device for locating an image recording of an object, recorded by at least one imaging recording device from a distance, wherein the device is programmed to carry out a method which comprises:

acquiring image data which represent the image recording and a point in time of recording;

acquiring measurement data which represent, for the point in time of recording, a respective measurement signal of at least one sensor device which is arranged in a surface portion of the object, captured by the image recording, at a location with a location information that is known and which in this context is configured to detect electromagnetic radiation which is incident on the sensor device from an optical path located between the object and the sensor device, and to generate the measurement signal as a function of the radiation detected;

matching the image data and the measurement data, wherein a first image of a medium which is at least partially located in the optical path of the electromagnetic radiation, which image is represented by the image data, is compared with a second image of the medium, which image is represented by the measurement data, in order to identify, with respect to their respective image content, mutually corresponding image portions of the first and second images; and locating the image recording with respect to the object by a determination of a position in the image recording which corresponds to the location of the sensor device based on the matching, and an associating of the location information with this position.

17. A computer program or a non-volatile computer readable storage medium which comprises instructions which, when they are being executed on a computer or on a multi-computer platform, cause the computer or the multi-computer platform to carry out a method comprising:

acquiring image data which represent the image recording and a point in time of recording;

acquiring measurement data which represent, for the point in time of recording, a respective measurement signal of at least one sensor device which is arranged in a surface portion of the object, captured by the image recording, at a location with a location information that is known and which in this context is configured to detect electromagnetic radiation which is incident on the sensor device from an optical path located between the object and the sensor device, and to generate the measurement signal as a function of the radiation detected;

matching the image data and the measurement data, wherein a first image of a medium which is at least partially located in the optical path of the electromagnetic radiation, which image is represented by the image data, is compared with a second image of the medium, which image is represented by the measurement data, in order to identify, with respect to their respective image content, mutually corresponding image portions of the first and second images; and locating the image recording with respect to the object by a determination of a position in the image recording which corresponds to the location of the sensor device based on the matching, and an associating of the location information with this position.

* * * * *